United States Patent
Lombardi

(10) Patent No.: US 7,402,622 B1
(45) Date of Patent: Jul. 22, 2008

(54) POWDER INJECTION MOLDING COMPOSITION

(76) Inventor: John Lombardi, 831 N. Camino Miramonte, Tucson, AZ (US) 85716

(*) Notice: Subject to any disclaimer, the term of this patent is extended or adjusted under 35 U.S.C. 154(b) by 367 days.

(21) Appl. No.: 10/277,459

(22) Filed: Oct. 22, 2002

(51) Int. Cl.
*C08K 3/08* (2006.01)
*C08K 3/00* (2006.01)

(52) U.S. Cl. ..................... 524/440; 524/439

(58) Field of Classification Search .............. 106/38.25, 106/38.8, 270, 287.18, 287.19, 287.3; 252/182.12, 252/182.33, 182.34; 524/548, 549, 556, 524/560, 577, 583, 584, 585, 586, 439, 440, 524/494, 406, 408, 413, 435, 487, 98, 490, 524/104, 106, 100, 99
See application file for complete search history.

(56) References Cited

U.S. PATENT DOCUMENTS

| | | | | |
|---|---|---|---|---|
| 3,904,573 A * | 9/1975 | Klein et al. | ................ | 528/248 |
| 3,937,678 A * | 2/1976 | Yasuda et al. | ............... | 106/270 |
| 4,022,752 A * | 5/1977 | Horn et al. | ................... | 524/98 |
| 4,185,047 A * | 1/1980 | Cohen | ......................... | 525/94 |
| 4,187,358 A * | 2/1980 | Kyo et al. | .................. | 525/132 |
| 4,235,241 A * | 11/1980 | Tabuchi et al. | .............. | 600/396 |
| 4,671,889 A * | 6/1987 | Schreiner et al. | ......... | 252/181.2 |
| 4,776,979 A * | 10/1988 | Kageyama | ................... | 252/512 |
| 4,987,168 A * | 1/1991 | Kerschbaumer | ............. | 524/104 |
| 5,047,182 A * | 9/1991 | Sundback et al. | ............ | 264/28 |
| 5,047,450 A * | 9/1991 | Wilder | ....................... | 523/435 |
| 5,079,284 A * | 1/1992 | Nakane et al. | ................ | 524/97 |
| 5,283,213 A * | 2/1994 | Ohst et al. | ................... | 264/645 |
| 5,380,179 A * | 1/1995 | Nishimura et al. | ........... | 419/36 |
| 5,599,860 A * | 2/1997 | Memon et al. | .............. | 524/151 |
| 6,034,159 A * | 3/2000 | Malcolm | ..................... | 524/293 |
| 6,051,184 A * | 4/2000 | Kankawa | ..................... | 419/36 |
| 6,107,430 A * | 8/2000 | Dubois et al. | ............. | 526/348.5 |
| 6,846,862 B2 * | 1/2005 | Schofalvi et al. | ............ | 524/195 |
| 2002/0022189 A1 * | 2/2002 | Kawanishi et al. | ........ | 430/108.8 |
| 2005/0026017 A1 * | 2/2005 | Seabaugh et al. | ............. | 429/30 |

OTHER PUBLICATIONS

Lewis, Sr., Richard J.; Hawley's Condensed Chemical Dictionary 13th Ed., John Wiley & Sons, New York, 1997 (p. 494).*

* cited by examiner

*Primary Examiner*—Glenn Caldarola
*Assistant Examiner*—Jim Goloboy
(74) *Attorney, Agent, or Firm*—Dale F. Regelman; Quarles & Brady LLP

(57) ABSTRACT

An powder injection molding composition is disclosed. The composition comprises caprolactam and a plurality of particles, where that plurality of particles is selected from a metal powder, a metal hydride powder, a ceramic powder, a ferrite powder, and mixtures thereof. The composition optionally further comprises a wax and polymeric material.

2 Claims, 3 Drawing Sheets

POWDER INJECTION MOLDING COMPOSITION

FIELD OF THE INVENTION

The invention relates to a molding composition which includes a metal powder, a ceramic powder, and/or a ferrite powder, in combination with a binder component comprising one or more nitrogen-containing compounds. The invention further relates to a method to form a shaped article using Applicant's molding composition.

BACKGROUND OF THE INVENTION

Powder Injection Molding (PIM) is an attractive process to form shaped parts. Using such a PIM process, metal, ceramic, and/or ferrite powder is combined with a carrier, such as one or more carbon-containing materials, and that resulting mixture is molded into a desired shape, sometimes called a "green body." The one or more carbon-containing materials functions as, among other things, a binder which facilitates molding of the metal/ceramic/ferrite powder into the green body. The one or more carbon-containing materials are then removed via thermal and/or solvent means. Thereafter, the remaining shaped powder is sintered to produce the desired metal/ceramic/ferrite shaped article. In order to minimize, and hopefully to, prevent the formation of defects in, and/or inclusion of impurities in, the final shaped article, it is desirable that the one or more carbon-containing materials be completely removed from the green body prior to sintering.

PIM is a particularly appealing process for forming shaped items comprising titanium due to: low processing temperatures, longer mold lifetimes, and ability to produce near net shaped parts requiring minimal final machining. As those skilled in the art will appreciate, shaped titanium parts have utility as medical implants, i.e. bone screws and plates, golf club heads, and as aerospace components. Despite these advantages, however, the high reactivity of titanium and its susceptibility towards forming solid solutions with commonly occurring elements (i.e. oxygen, carbon, and nitrogen), requires that the one or more carbon-containing materials be completely removed from the shaped body at temperatures below about 500° C., and more preferably near 450° C. Applicant's invention comprises a PIM formulation and method which produces a low viscosity, easily moldable composition to form green titanium body which can be debound and sintered to produce, for example, titanium parts having a bulk density almost equal to the density of naturally-occurring titanium metal.

SUMMARY OF THE INVENTION

Applicant's invention includes a molding composition, comprising a plurality of particles, where those particles are selected from a metal powder, a ceramic powder, a ferrite powder, and mixtures thereof, in combination with one more nitrogen-containing compounds comprising between about 3 and about 20 carbon atoms. Applicant's invention further includes a method to form a shaped article. Applicant's method first provides one or more nitrogen-containing compounds comprising between about 3 carbon atoms and about 20 carbon atoms. Those one or more nitrogen-containing compounds are then liquefied to form a molten binder component.

Applicant's method then provides a plurality of particles, where those particles are selected from the group consisting of a metal powder, a ceramic powder, a ferrite powder, and combinations thereof, and forms a mixture comprising the plurality of particles and the molten binder component. That liquid particle/binder mixture is introduced into a mold having an internal cavity formed in a desired shape. The particle/binder mixture is allowed to solidify to form a shaped green body. That shaped green body is heated at up to 2500° C. to form a shaped article.

BRIEF DESCRIPTION OF THE DRAWINGS

The invention will be better understood from a reading of the following detailed description taken in conjunction with the drawings in which like reference designators are used to designate like elements, and in which.

DETAILED DESCRIPTION OF THE PREFERRED EMBODIMENTS

Figure 1:
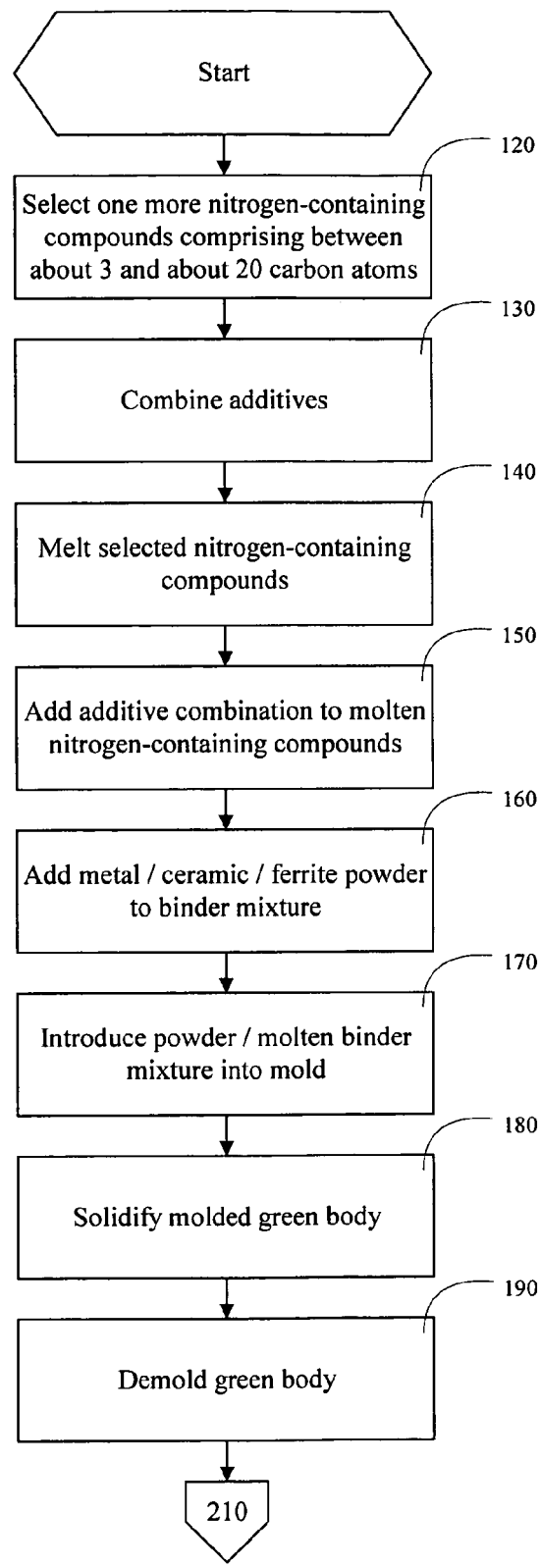
FIG. 1 is flow chart summarizing the initial steps of Applicant's method.

In certain embodiments, Applicant's invention includes a molding composition comprising titanium powder, titanium hydride powder, zirconium powder, rhenium powder, tantalum powder, tungsten carbide powder, ferrite powder, ceramic powder and mixtures thereof. By "ferrite powder," Applicant means an iron-based ferromagnetic powder, including $BaFe_{12}O_{19}$, $SrFe_{12}O_{19}$, and the like, and mixtures thereof. By "ceramic powder," Applicant means a powder formed from inorganic, nonmetallic materials which are typically crystalline in nature and comprise compounds formed between metallic and nonmetallic elements, such as aluminum and oxygen (alumina-$Al_2O_3$), calcium and oxygen (calcia-CaO), and silicon and nitrogen (silicon nitride-$Si_3N_4$).

In certain of these embodiments, the metal/ceramic/ferrite powder comprises particles having an average diameter between about 10 microns and about 150 microns. In certain embodiments, Applicant's composition includes powder formed of particles having an average diameter of about 45 microns. The particles can be either irregularly-shaped, spherically-shaped, or a combination of both.

In the titanium powder embodiments, the titanium powder is of a kind sometimes called "chemically pure (CP)," and/or ASTM Titanium Alloy grades 1 through 4. Such grades are well known to those skilled in the art of powder metallurgy.

In alternative embodiments, Applicant's invention includes a molding composition comprising a powder formed of a titanium alloy of the general formula $Ti_xM1_yM2_z$, and wherein M1 & M2 are metals selected from the group consisting of Aluminum, Vanadium, Molybdenum, Chromium, Tin, Zirconium, Manganese, Silicon, and Palladium Examples of suitable titanium-based alloys include but are not limited to the following compositions:

Ti-6Al-4V

Ti-5Al-2.5Sn

Ti-5Al-6Sn-2Zr-1Mo-0.2Si

Ti-6Al-2Sn-4Zr-2Mo

Ti-8Al-1Mo-1V

Ti-6Al-6V-2Sn

Ti-6Al-2Sn-4Zr-6Mo,Ti-8Mn

Ti-8Mo-8V-2Fe-3Al

Ti-13V-11Cr-3Al

Ti-11.5Mo-6Zr-4.5Sn

In certain embodiments, Applicant's molding composition comprising a titanium alloy of the formula Ti-6Al-4V in powder form, wherein that powder comprises particles having the dimensions and shape(s) described above.

In alternative embodiments, Applicant's invention includes a molding composition comprising a powder formed of a titanium and/or a titanium alloy in combination with one or more ceramic particulate/fibrous reinforcing phase. Examples of such ceramic reinforcement phases include one or more carbides, oxides, and nitrides of boron, silicon, aluminum, titanium, and mixtures thereof.

In certain embodiments of Applicant's invention, the titanium/titanium alloy component is present in Applicant's molding composition at a level between about 70 weight percent and about 90 weight percent. In certain embodiments of Applicant's invention, the titanium/titanium alloy component of Applicant's molding composition is present at a level between about 75 weight percent and about 85 weight percent.

In certain embodiments, Applicant's invention includes a molding composition comprising one more nitrogen-containing compounds comprising between about 3 and about 20 carbon atoms. In certain embodiments, the one or more nitrogen-containing compounds have structure I, II, III, IV, V, VI, and/or VII:

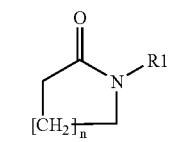

I

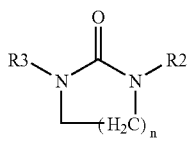

II

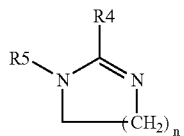

III

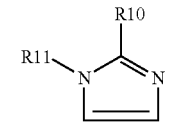

IV

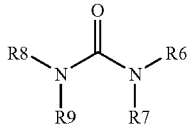

V

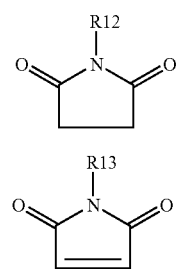

VI

VII wherein n is between about 1 and about 12, and where R1, R2, R3, R4, R5, R6, R7, R8, R9, R10, R11, R12, and R13, are each independently selected from the group which includes hydrogen, alkyl, cycloalkyl, vinyl, alkenyl, cycloalkenyl, phenyl, and benzyl.

For example, ε-caprolactam, structure I where n=3 and R1 is H, melts at 70° C. to give a low viscosity fluid (12.3 cP). Applicant has found that the caprolactam melt readily wets the surface of titanium particles, thereby facilitating relatively uniform dispersion of those particles in the melt. In addition, caprolactam has low toxicity and is readily available commercially in high purity. Furthermore, Applicant has found that caprolactam-based PIM formulations rapidly solidify upon cooling to form a green body having superior mechanical properties which facilitate easily handling and subsequent processing.

In certain embodiments of Applicant's molding composition, the one or more nitrogen-containing compounds having structure I, II, III, IV, and/or V, are present from about 1 weight percent to about 30 weight percent. In other embodiments, those one or more nitrogen-containing compounds are present from about 15 weight percent to about 25 weight percent.

In certain embodiments of Applicant's invention, Applicant's composition includes one or more additives. These additives enhance the molding characteristics of Applicant's composition, and enhance the strength of the green body formed using Applicant's composition and method. In certain embodiments, these one or more additives are present in Applicant's composition in an aggregate amount of between about 0.1 weight percent and about 5.0 weight percent. In certain embodiments, these one or more additives are present in an aggregate amount of between about 1.0 weight percent and about 3.0 weight percent.

Certain embodiments of Applicant's composition include one or more polymeric materials. Such polymeric materials include homopolymers and/or copolymers formed from ethylene, propylene, acrylic acid, acrylic acid esters, methacrylic acid, methacrylic acid esters, N-vinyl pyridine, N-vinyl pyrrolidone, N-vinyl caprolactam, maleic anhydride and combinations thereof. For example, ethylene-co-acrylic acid (EAA) polymers and copolymers have an affinity for titanium surfaces, and thermally decompose at temperatures below 450° C. In other embodiments, Applicant's composition includes polystyrene (PS). In yet other embodiments, Applicant's composition includes poly-α-methylstyrene (PMS). Both PS and PMS thermally decompose and unzip at temperatures below 370° C. By "unzip," Applicant means a process wherein the polymer chain decomposes into individual monomer units.

The following Example I is presented to further illustrate to persons skilled in the art how to make and use the invention and to identify presently preferred embodiments thereof. This Example I is not intended, however, as a imitation upon the scope of Applicant's invention, which is defined only by the appended claims.

Example I

The formulation of Example I includes a metal component and a binder component. Table I recites the binder component of this Example I.

TABLE I

| Component | Weight Percent Of Non-Metal Portion |
|---|---|
| Caprolactam | 94.0 |
| A-C 5120 Ethylene-co-Acrylic Acid Polymer* | 6.0 |

*Honeywell Performance Polymers, Morristown, N.J. Acid #120 mg KOH/g.

Table II recites the complete formulation of this Example I.

TABLE II

| Component | Weight Percent Of Formulation |
|---|---|
| Titanium powder | 81.7 |
| Caprolactam | 17.2 |
| A-C 5120 Ethylene-co-Acrylic Acid Polymer | 1.1 |

The product of EXAMPLE I, when processed using the steps of FIG. 1, discussed below, yields a green body having a 49.8 volume percent solids content.

The following Example II is presented to further illustrate to persons skilled in the art how to make and use the invention and to identify presently preferred embodiments thereof. This Example II is not intended, however, as a limitation upon the scope of the invention, which is defined only by the appended claims.

Example II

The formulation of this Example II includes a metal portion and a binder portion. Table III recites the components comprising the binder portion.

TABLE III

| Component | Weight Percent Of Non-Metal Portion |
|---|---|
| Caprolactam | 94.3 |
| A-C 5120 Ethylene-co-Acrylic Acid Polymer* | 4.3 |
| Primacor 5990I Polyethylene-co-Acrylic Acid** | 1.4 |

*Honeywell Performance Polymers, Morristown, NJ
**Dow Chemical Corporation, Midland, MI Table IV recites the components, and the weight percentages of those components, in the formulation of this Example II.

TABLE IV

| Component | Weight Percent Of Formulation |
|---|---|
| Titanium powder | 79 |
| Caprolactam | 19.8 |

TABLE IV-continued

| Component | Weight Percent Of Formulation |
|---|---|
| A-C 5120 Ethylene-co-Acrylic Acid Polymer | 0.91 |
| Primacor 5990I Polyethylene-co-Acrylic Acid | 0.29 |

The product of EXAMPLE II, when processed using the steps of FIG. 1, discussed below, yields a green body having a 45.7 volume percent solids content. In accord with step 130 (FIG. 1) of Applicant's method discussed below, the A-C 5120 component and the Primacor component were combined in the melt to form about a 84.6% A-C 5120/5.4% Primacor weight percentage mixture. In accord with step 150 (FIG. 1), that additive combination was then added to molten caprolactam.

The following Example III is presented to further illustrate to persons skilled in the art how to make and use the invention and to identify presently preferred embodiments thereof. This Example III is not intended, however, as a limitation upon the scope of the invention, which is defined only by the appended claims.

Example III

The formulation of this Example III includes a metal portion and a binder portion. Table V recites the components comprising the binder portion.

TABLE V

| Component | Weight Percent Of Non-Metal Portion |
|---|---|
| Caprolactam | 87.5 |
| Endex 160 Poly[styrene-co-α-methylstyrene]* | 12.5 |

*Eastman Chemical Corp. Kingsport, TN

Table VI recites the components, and the weight percentages of those components, in the formulation of this Example III.

TABLE VI

| Component | Concentration (wt. %) |
|---|---|
| Titanium powder | 77.6 |
| Caprolactam | 19.6 |
| Endex 160 Polystyrene-co-α-methylstyrene* | 2.8 |

The product of EXAMPLE III, when processed using the steps of FIG. 1, discussed below, yields a green body having a 43.5 volume percent solids content.

Examples I, II, and III, include a single phase non-metallic portion. In certain embodiments, Applicant's composition includes a two phase non-metallic portion. The addition of wax to the caprolactam produces a two phase organic binder which is readily moldable, solidifies rapidly, while allowing a significant portion of the binder can be removed via solvent extraction prior to thermal debinding operations. By "wax", Applicant means a material having a molecular weight of about 5,000 Daltons or less, which is solid at room temperature. In certain embodiments, the wax component of Applicant's composition comprises one or more esters, one or more fatty acids, one or more alcohols, one or more hydrocarbons, and combinations thereof.

Solvent extractable binder systems have a significant advantage over traditional thermal debinding systems. In particular, diffusion is the rate limiting step for binder removal during thermal operations and the binder diffusivity scales with green part thickness according to the square root of time, $$X^2 \approx 2Dt$$

where X represents the semi-thickness for flat plate green specimen, D comprises the Diffusivity of one or more components from the non-metallic portion, and t comprises the debinding operation time.

In order to prevent cracking and stress build up during thermal debinding operations it is necessary to slowly heat the green parts in a furnace. As those skilled in the art will appreciate, such a lengthy processing time limits furnace availability and decreases the overall production rate of sintered PIM metal parts.

Applicant has discovered, however, that immersion of green parts formed using Applicant's two phase binder portion in a solvent which selectively extracts one of the binder components from the molded green parts forms porosity and channels within that green part. Applicant has further discovered that the resulting porosity/channel structure significantly reduces the time required for thermally debinding the molded green part. Furthermore, such solvent extraction procedures do not require large capital expenditure to obtain expensive processing equipment. For example, green parts formed using Applicant's two phase binder system can be immersed in a solvent bath. In certain embodiments, Applicant's method includes heating that solvent bath. In certain embodiments, Applicant's method includes using a piezoelectric transducer to emit ultrasonic energy to enhance selective extraction of one or more binder components from the molded green part.

In certain embodiments, Applicant's two phase binder portion includes a hydrocarbon wax. Applicant has further discovered that use of such a wax with caprolactam reduces the sensitivity of the molded parts to ambient humidity. Caprolactam is hygroscopic. Green parts molded from a binder comprising high levels of caprolactam might soften or swell if exposed to a humid environment over an extended period of time. Applicant has found, however, that addition of a wax component to the binder portion imparts hydrophobicity to the binder and reduces green part humidity sensitivity.

Molten caprolactam is miscible with most organic compounds except straight chain aliphatic hydrocarbons. Molten paraffin and polyethylene waxes, however, are not soluble in molten caprolactam. Applicant's two phase binder system takes advantage of this phenomena whereby caprolactam forms an emulsion with molten wax. Solidification of this mixture yields a two phase organic system composed of pure caprolactam and wax regions.

In certain embodiments, Applicant's two phase binder system comprises a high concentration of extractable caprolactam phase. In certain embodiments, Applicant's binder system comprises more than about fifty volume percent caprolactam. In these embodiments, selective removal of the caprolactam portion of a molded green part forms an interconnected pore network through which solvent may percolate.

In order to stabilize Applicant's emulsion binder system, certain embodiments include one or more compatibilizers. Those one or more compatibilizers are added to the molten binder system. These one or more compatibilizers stabilize the individual droplet size of the caprolactam dispersed phase, preventing those individual droplets from coalescing. Coalescence is undesirable since it adversely effects binder viscosity and lowers the uniformity of the Ti metal powder dispersed throughout the molded green part.

Carboxylic acids have been shown to strongly hydrogen bond to caprolactam. Useful emulsion compatibilizers will exhibit affinity for both the nonpolar wax as well as the caprolactam phase. Applicant has found that suitable compatibilizers partition at the wax/caprolactam interfaces comprising the emulsion. Fatty carboxylic acids/amides, such as stearic acid, or carboxylic acid functionalized waxes such as Baker Petrolite (Sugar Land, Tex.) Unicid 350, are useful compatibilizers. In addition, Applicant has found that polyethylene copolymers having acrylic or methacrylic acid functionality are useful stabilizers for his two phase binder system. In certain embodiments, Applicant's composition includes Primacor 58801 Polyethylene-co-acrylic acid copolymer sold by Dow Plastics, Midland, Mich.

In certain embodiments, ethylene acrylic acid copolymers are preferred over fatty acids and polar waxes as compatibilizers due to the ability of the former to also enhance the toughness of the green molded part. In certain embodiments, Applicant's compatibilizers include hydrocarbons functionalized with polar head groups such as amide or alcohol moieties capable of hydrogen bonding with caprolactam. Certain embodiments of Applicant's two phase binder system include stearamide and/or stearyl alcohol. Example solvent extractable binder compositions are detailed below.

In certain embodiments, Applicant's composition includes one or more waxes having a higher melting point than caprolactam. In certain embodiments, the wax component of Applicant's composition has a melting point greater than about 69° C. Such binder systems facilitate removal of the caprolactam from the molded green part by liquefaction/melting without compromising the dimensional integrity of that molded part. In these embodiments, the higher melting point wax portion comprises a three-dimensional network maintaining the molded part's shape while the molten caprolactam is solvent extracted from that molded green part. Molten caprolactam has a low melt viscosity and dissolves more rapidly in solvent than solid caprolactam.

In certain embodiments, the wax portion has a melting point greater than about 80° C. to minimize wax recrystallization. Certain embodiments of Applicant's composition include paraffin, polyethylene, and/or polypropylene type waxes. Applicant has further discovered that a narrow molecular weight distribution for the wax component gives a more crystalline material. A more crystalline wax is generally less soluble in the solvent used to selectively remove the caprolactam portion of Applicant's binder. In certain embodiments, the polydispersity, i.e. the Mw/Mn, of Applicant's wax component is about 2 or less, where Mw represents the weight average molecular weight and Mn represents the number average molecular weight. In certain embodiments, the polydispersity of Applicant's wax component is about 1.1 or less In certain embodiments of Applicant's method, in addition to removal via solvent extractive methods, the molten caprolactam can also be removed using other binder removal techniques known in the art including via capillary action by placing the molded green parts in a heated bed filled with finely ground inorganic particulates such as submicron sized alumina.

The following Example IV is presented to further illustrate to persons skilled in the art how to make and use the invention and to identify presently preferred embodiments thereof. This Example IV is not intended, however, as a limitation upon the scope of the invention, which is defined only by the appended claims.

Example IV

The formulation of this Example IV includes a metal portion and a binder portion. Table VII recites the components comprising the binder portion.

TABLE VII

| Component | Weight Percent Of Non-Metal Portion |
|---|---|
| Caprolactam | 51.6 |
| Polywax 500* Polyethylene Wax | 35.6 |
| Primacor 5990I** Polyethylene-co-acrylic acid | 12.8 |

*Baker Petrolite Corp. Sugarland, TX
**Dow Plastics Midland, MI

A 1 cm thick rectangular sample of the above composition was prepared by first melt blending Primacor with wax at 95° C. followed by caprolactam addition. The resultant mixture was solidified at room temperature producing a white, translucent mass having a high uniformity of dispersed caprolactam phase. The sample was then immersed overnight in a solvent bath composed of reagent grade isopropanol heated at 70° C. After immersion, the sample was dried and re-weighed revealing a sample mass loss of 49.1 wt. %.

Table VIII recites an embodiment of Applicant's composition which comprises the binder system of Table VII.

TABLE VII

| Component | Concentration (wt. %) |
|---|---|
| Titanium powder | 81.1 |
| Caprolactam | 9.8 |
| Polywax 500 Polyethylene Wax | 6.7 |
| Primacor 5990I** Polyethylene-co-acrylic acid | 2.4 |

After selective removal of the caprolactam portion from a green part formed using the composition of Table VI, that extracted green part had about a 48.7 volume percent solid content.

Applicant's invention includes a method to prepare a green body using Applicant's molding composition. Referring now to FIG. 1, in step 120 one more nitrogen-containing compounds comprising between about 3 and about 20 carbon atoms are selected. In step 130, any additives to be used are combined. In certain embodiments, such one or more additives are dry blended using conventional mixing techniques. In alternative embodiments, such one or more additives are melt blended using conventional techniques. In certain embodiments, the additives of step 130 include one or more polymeric materials, one or more waxes, one or more stabilizers, and/or combinations thereof. The nitrogen-containing compounds are heated at a temperature and for a time sufficient to transition from a solid phase to a liquid phase. Thereafter, in step 150 the additives of step 130 are added to the molten one more nitrogen-containing compounds to form Applicant's binder component. In certain embodiments, the one or more additives are added as a solid mixture to the liquefied one more nitrogen-containing compounds of step 140. In other embodiments, the one or more additives are added as a liquid to the liquefied one more nitrogen-containing compounds.

In step 160, the metal/metal alloy/ceramic/ferrite powder is added to the liquefied binder of step 150 using conventional mixing technique to form Applicant's molding composition. In step 170, Applicant's molding composition is introduced into a mold. In certain embodiments, Applicant's molding composition is poured into a rubber latex mold. In alternative embodiments, an automated molding apparatus is used to introduce Applicant's molding composition into a suitable mold.

In step 180, the mold and its contents are allowed to cool to a temperature sufficient to solidify the molded green body formed using Applicant's molding composition. In step 190, the solidified green body is removed from the mold. In certain embodiments, Applicant's method transitions from step 190 to step 205. In other embodiments, Applicant's method transitions from step 190 to step 230.

In the embodiments which include step 205, Applicant's method selectively removes the one or more nitrogen-containing compounds of step 120 (FIG. 1) prior to removing the additive compounds of step 130 (FIG. 1). In step 210, the molded green body is removeably placed into a solvent bath. The solvent bath includes a solvent which selectively removes, i.e. dissolves, the one or more nitrogen-containing compounds while not removing the other binder components, such as the wax portion for example.

Table IX recites certain Henry's Law parameters and certain Octanol/Water Partition Coefficient values for a variety of solvents.

TABLE IX

| Solvent | Henry's Law Constant $k°_H$ (mol/Kg*bar)* | Octanol - Water Partition Coefficient log $P_{OW}$** |
|---|---|---|
| Hexane | 0.001 | 4 |
| Trichloroethylene | 0.11 | 2.42 |
| Methylene Chloride | 0.41 | |
| Ethylene Dichloride | 0.80 | |
| Carbon Tetrachloride | 0.03 | 2.64 |
| Benzene | 0.18 | 2.13 |
| Toluene | 0.15 | 2.69 |
| Chloroform | 0.25 | 1.97 |
| Diethyl Ether | 0.78-1.2 | 0.77 |
| Ethyl Acetate | 8.9 | 0.66 |
| Acetone | 30 | -0.24 |
| MEK | 20 | 0.28 |
| THF | 14-22 | 0.45 |
| Isopropanol | 130 | -0.16 |
| Ethanol | 200 | -0.31 |
| Methanol | 200 | -0.82 |
| Dioxane | 140 | -0.42 |

*Henry's Constant Values above are for solute solubility in water at 298.15 K as reported by the National Institute of Standards and Technology ("NIST"), at the NIST Chemistry WebBook and NIST Standard reference Database Number 69, July 2001 Release

**Octanol—Water Partition Coefficient Values obtained from Handbook of Environmental Data on Organic Compounds—$4^{th}$ Edition, Karel Verschueren, John Wiley & Sons New York, 2001

As those skilled in the art will appreciate, Henry's Law Constant is obtained using the equation:

$$k°_H = P_{solute}/C_{solute} \text{ for solute solubility in water at 298.15 K}$$

where $P_{solute}$ comprises the Partial Pressure of Solute in water solution, and $C_{solute}$ comprises the Molar concentration of Solute dissolved in water.

In certain embodiments of Applicant's method, the one or more solvents of step 210 have log $P_{OW}$ values less than about 1. In certain embodiments, the one or more solvents of step 210 have log $P_{OW}$ values greater than about −0.9 and less than about 1. As those skilled in the art will appreciate, caprolactam has a log $P_{OW}$ value of about 0.12.

In certain embodiments, Applicant's method transitions from step 210 to step 230. In certain embodiments, Applicant's method transitions from step 210 to step 215 wherein the one or more solvents of step 210 are heated. In certain embodiments, step 215 includes heating the one or more solvents of step 210 to a temperature greater than about 60° C. In certain embodiments, Applicant's method transitions from step 215 to step 230.

In certain embodiments, Applicant's method transitions from step 215 to step 220 wherein the molded green body/solvent combination is treated with ultrasonic sound waves to assist removal of the one or more nitrogen-containing compounds from the green part. Applicant's method transitions from step 220 to step 230.

In step 230, the molded green body of step 190 (FIG. 1), or step 210, or step 215, or step 220, is placed in a suitably dimensioned vacuum oven which is then evacuated until an internal pressure of about 50 mm Hg or lower is reached. In step 240, the internal temperature of the oven is increased from room temperature, i.e. about 21° C., to about 70° C. over a period of about 30 minutes. Thereafter in step 250, the internal temperature of the oven is increased from about 70° C. to about 85° C. over a period of about 60 minutes.

In step 260, the oven temperature is maintained at about 85° C. for about ten hours. Thereafter in step 270, the internal temperature of the oven is increased from about 85° C. to about 250° C. over a period of about 120 minutes. Thereafter in step 280, the internal temperature of the oven is increased from about 250° C. to about 280° C. over a period of about 60 minutes. In step 290, the oven temperature is maintained at about 280° C. for about six hours.

Figure 2:
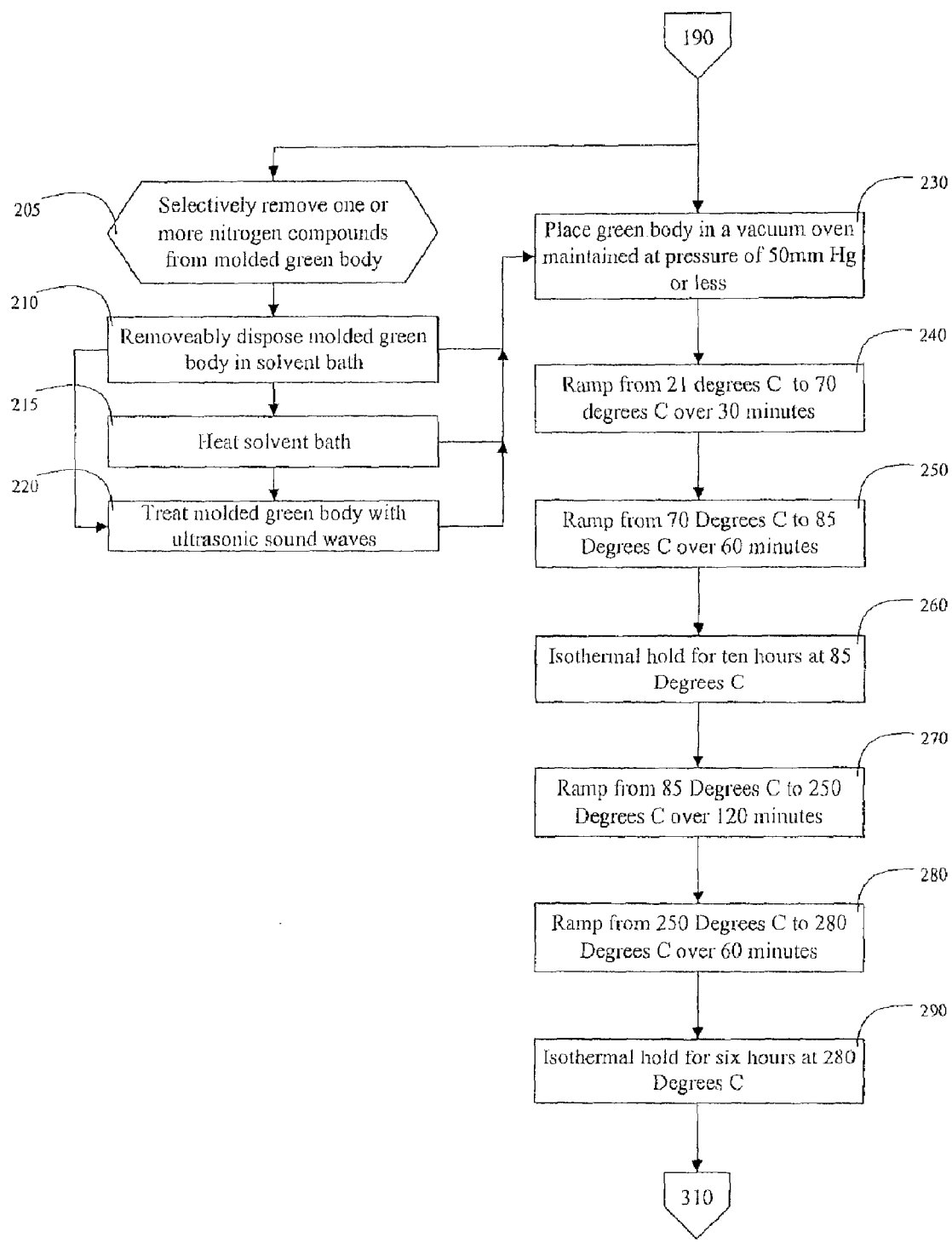
FIG. 2 is a flow chart summarizing additional steps in Applicant's method.

After processing the green body formed using the steps/embodiments of FIGS. 1 and 2, most of the carbon-based components of Applicant's molding composition have been removed from the shaped article. Thereafter, the shaped article is "sintered" in a vacuum furnace at reduced pressure to fuse the individual metal particles. Table X recites the melting points for the various metals comprising embodiments of Applicant's molding composition. Green parts formed with the metals/compounds recited in Table X are sintered to produce shaped articles at temperatures between the recited "Onset Sintering Temperature" and the "Melting Point."

TABLE X

| Compound | Melting Point (° C.) | Onset Sintering Temperature (° C.) |
|---|---|---|
| WC | 2780 | 1834 |
| W | 3410 | 2250 |
| Ta | 2996 | 1977 |
| Ti | 1675 | 1106 |
| Zr | 1850 | 1221 |
| Re | 3180 | 2200 |

In certain embodiments, the shaped article of step 290 is allowed to cool to room temperature, and that article is sintered at a later time. In other embodiments, the sintering process follows the debinding steps directly.

Figure 3:
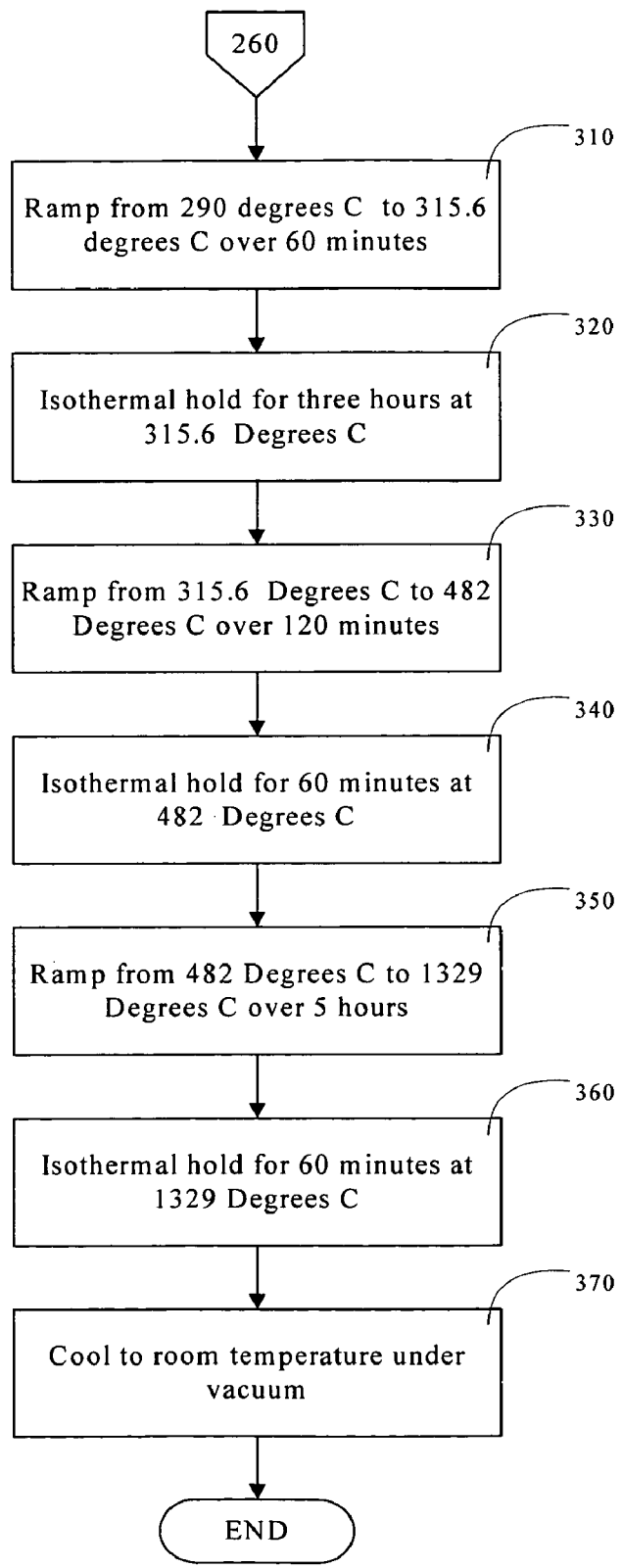
FIG. 3 is a flow chart summarizing the final steps in Applicant's method.

Referring now to FIG. 3, steps 310 through 370 summarize the sintering of a titanium shaped article. In certain embodiments, step 310 includes heating the green part from the temperature of about 280° C. of step 290 to a temperature of about 315.6° C. In other embodiments, in step 310 the processed but unsintered green part is disposed in a vacuum oven and the internal temperature of the furnace is increased to about 315.6° C. over a period of about 60 minutes. In step 320, the furnace temperature is maintained at about 315.6° C. for about three hours.

Thereafter, in step 330 the internal temperature of the furnace is increased from about 315.6° C. to about 482° C. over a period of about 120 minutes. In step 340, the oven temperature is maintained at 482° C. for 60 minutes. Thereafter, in step 350 the internal temperature of the furnace is increased from about 482° C. to about 1329° C. over a period of about five hours. In step 360, the furnace temperature is maintained at about 1329° C. for about 60 minutes. In step 370, the furnace is allowed to cool to room temperature after which the newly-formed, high density, metal/metal alloy part is removed from the furnace.

Use of Applicants' composition and method yields shaped articles having unexpectedly low levels of oxygen and residual carbon. As those skilled in the art will appreciate, the higher the residual carbon level the lower the mechanical properties of the formed part. For example, oxygen is highly soluble in the titanium metal crystal lattice, and the presence of such oxygen generally reduces the ductility of the formed part.

Applicant's formulation described in Example III was prepared using Titanium powder having an initial oxygen content of about 0.53%. After debinding and sintering using Applicants' method, the sintered Titanium body had an oxygen content of about 0.65%. As those skilled in the art will appreciate, use of Applicants' composition and method yielded a sintered Titanium body having an incremental oxygen level of only about 0.12%. Moreover, the residual Carbon impurity level in this sintered Titanium body was less than about 0.088%.

The following Examples V and VI are presented to further illustrate to persons skilled in the art how to make and use the invention and to identify presently preferred embodiments thereof. These Examples V and VI are not intended, however, as limitations upon the scope of the invention, which is defined only by the appended claims.

Example V

| Component | Concentration (Wt. %) |
|---|---|
| Ti-6Al-4V Powder | 87.1 |
| ε-Caprolactam | 12.2 |
| AC 5120 Ethylene-co-Acrylic Acid Wax | 0.57 |
| Primacor 5990I Polyethylene-co-Acrylic Acid | 0.13 |

Example VI

| Component | Concentration (Wt. %) |
|---|---|
| Ti-6Al-4V Powder | 83.5 |
| ε-Caprolactam | 15.6 |
| AC 5120 Ethylene-co-Acrylic Acid Wax | 0.80 |
| Primacor 5990I Polyethylene-co-Acrylic Acid | 0.10 |

In EXAMPLES IV and V, 200 mesh Ti-6Al-4V alloy powder having 0.165% initial oxygen assay was compounded with the components recited. Parts were molded, thermally debound, and sintered using Applicant's method described above. The oxygen assay for the formed parts of EXAMPLES IV and V were about 0.186% and about 0.193%, respectively. As those skilled in the art will appreciate, titanium parts having such minimal oxygen levels are suitable for use as structural aerospace materials. Moreover, such parts conform to both ASTM Standard B265/Grade 5, and ASM Standard 4906.

While the preferred embodiments of the present invention have been illustrated in detail, it should be apparent that modifications and adaptations to those embodiments may occur to one skilled in the art without departing from the scope of the present invention as set forth in the following claims.

I claim:

1. A-powder injection molding composition, comprising:
    a plurality of particles selected from the group consisting of a metal powder, a metal hydride powder, a ceramic powder, a ferrite powder, and mixtures thereof; and
    a binder consisting essentially of caprolactam and a polymeric material selected from the group consisting of polyethylene-co-acrylic acid and polystyrene-co-α-methylstyrene, wherein said-caprolactam is present at a level of 15 weight percent to 25 weight percent of said powder injection molding composition.

2. The composition of claim 1, wherein said plurality of particles is selected from the group consisting of titanium powder, titanium hydride powder, zirconium powder, rhenium powder, tantalum powder, tungsten carbide powder, and mixtures thereof.

* * * * *